(12) United States Patent
Yamanaka et al.

(10) Patent No.: US 7,552,663 B2
(45) Date of Patent: Jun. 30, 2009

(54) PARKING BRAKE APPARATUS

(75) Inventors: Fumikage Yamanaka, Saitama (JP);
Takahiko Midori, Saitama (JP); Satoru Masuda, Kanagawa (JP); Hiroshi Tsukamoto, Kanagawa (JP)

(73) Assignees: Honda Motor Co., Ltd., Tokyo (JP);
Otsuka Koki Kabushiki Kaisha, Kangawa (JP)

( * ) Notice: Subject to any disclaimer, the term of this patent is extended or adjusted under 35 U.S.C. 154(b) by 617 days.

(21) Appl. No.: 11/271,956

(22) Filed: Nov. 14, 2005

(65) Prior Publication Data
US 2006/0117900 A1 Jun. 8, 2006

(30) Foreign Application Priority Data
Nov. 30, 2004 (JP) ............................. 2004-345051

(51) Int. Cl.
*G05G 1/04* (2006.01)
(52) U.S. Cl. .................................................... 74/523
(58) Field of Classification Search ............... 74/473.3, 74/478, 490.12, 490.14, 500.5, 501.6, 512, 74/519, 527, 532, 533, 537, 577 R, 523
See application file for complete search history.

(56) References Cited

FOREIGN PATENT DOCUMENTS

| JP | 62-182868 U | 11/1987 |
|---|---|---|
| JP | 01-62164 U | 4/1989 |
| JP | 02-40661 U | 3/1990 |
| JP | 03-2868 U | 1/1991 |
| JP | 04-244461 | 9/1992 |
| JP | 2000-309255 | 11/2000 |
| JP | 2003-312459 | 11/2003 |

*Primary Examiner*—Vicky A Johnson
(74) *Attorney, Agent, or Firm*—Kubotera & Associates, LLC (57) ABSTRACT

A parking brake apparatus for activating a brake unit includes a base member; an operating lever supported on the base member for generating an operating force when the operating lever is operated so that the operating force is transmitted to the brake unit through a brake cable; an inputting member to be rotated with the operating lever; an intermediating member disposed separately from the inputting member for interconnecting the inputting member and the brake cable; and a connection member for connecting the intermediating member and the inputting member. Accordingly, the intermediating member transmits the operating force to the brake cable from the connection member.

7 Claims, 8 Drawing Sheets

PARKING BRAKE APPARATUS

BACKGROUND OF THE INVENTION AND RELATED ART STATEMENT

The present invention relates to a parking brake apparatus in which, when an operating lever supported on a base member is operated, an operating force is transmitted to a brake unit through a brake cable to generate a braking force.

Figure 8:
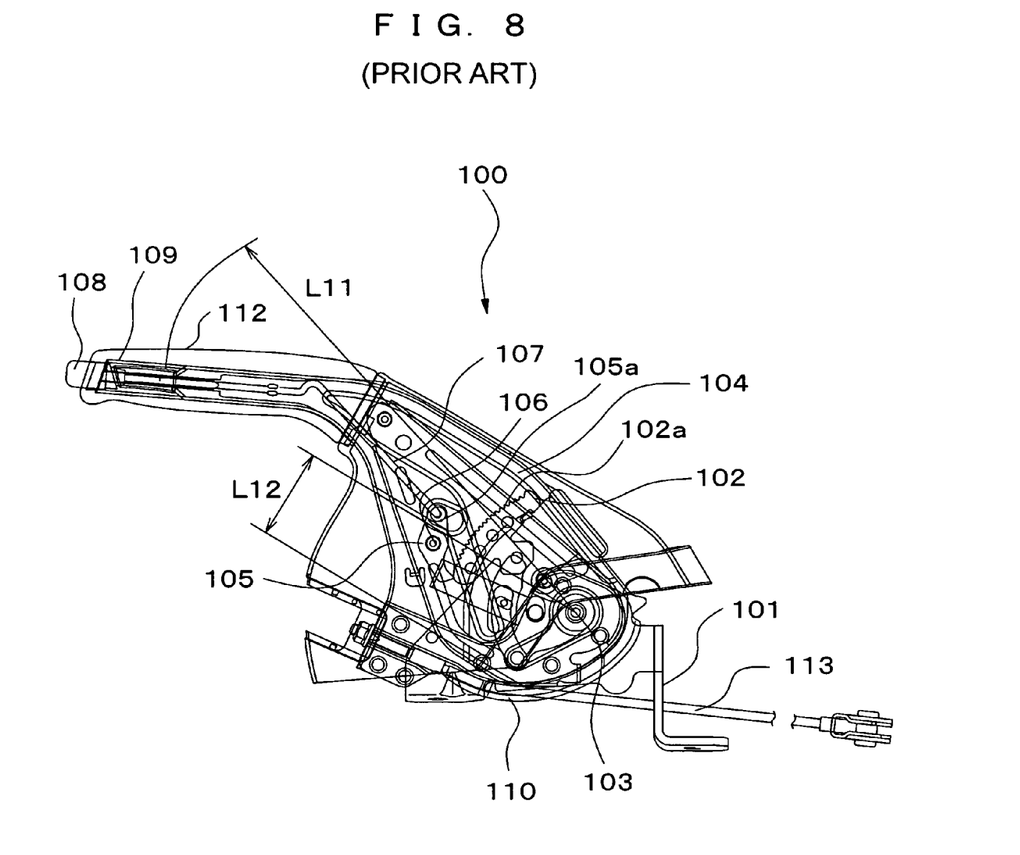
FIG. 8 is a perspective side view illustrating a conventional parking brake.

A conventional parking brake apparatus 100 is shown in FIG. 8. The parking brake apparatus 100 is disposed in the vicinity of a center console of an automobile, and a bracket 101 is mounted to a car body. A ratchet 102 is fixed to the bracket 101. A lever 104 is rockably pivoted to the bracket 101 by a pivotal pin 103, and a pawl 105 is rockably pivoted to the lever 104 through a pin 106. A nose of the pawl 105 can be engaged with a tooth part 102a of the ratchet 102.

A release rod 107 is connected to one end 105a of the pawl 105, and by pressing a release pushbutton 108 provided at one end of the release rod 107, the release rod 107 causes the pawl 105 to be released from the ratchet 102. When the pressing force is removed from the release pushbutton 108, a release spring 109 energizes the pawl 105 in a direction of being engaged with the tooth part 102a of the ratchet 102 through the release rod 107.

A cable guide 110 with a cable 113 wound thereon is provided on a side surface of the lever 104. One end of the cable 113 is fixed to the lever 104, and the other end is connected to a brake unit through the control cable. When a grip 112 is pulled, the cable 113 is drawn, so that the operating force is transmitted to the brake unit. At the same time, the energizing force of the release spring 109 causes the pawl 105 to make a repetitive motion while being guided by the tooth part 102a of the ratchet 102. With the pulling force of the grip 112, the pawl 105 is engaged with the tooth part 102a of the ratchet 102 through the action of the release spring 109. Accordingly, the grip 112 is locked to hold the braking force. When the release pushbutton 108 is pressed, the braking force is released.

In order to obtain a desired braking force in the parking brake apparatus 100, it is necessary to provide an appropriate lever ratio and output stroke (cable stroke). The lever ratio can be expressed as a ratio between a distance (L11) from the center of rotation of the lever 104 to a gripping part of the grip 112, and a distance (L12) from the center of rotation of the lever 104 to the cable 113. In order to provide the appropriate lever ratio and output stroke, the distance L11 needs to be 200 mm to 260 mm, and the output stroke needs to be approximately 30 mm.

However, when the distance L11 is 200 mm to 260 mm, it is necessary to install the center console in a limited space, or it is difficult for a passenger to walk through. Therefore, it is necessary to make the parking brake compact, thereby reducing the distance L11 without changing the lever ratio. That is, it is necessary to reduce the distance L12. When the distance L12 is reduced in a state that the cable 113 is wound on the cable guide 110 as mentioned above, the cable 113 is curved to a large extent. That is, every time the braking operation is performed, the cable 113 is heavily curved, thereby applying excess stress to the cable 113. Therefore, it is difficult to reduce the distance L12 and a size of the parking brake without changing the lever ratio.

In view of the problems described above, an object of the present invention is to provide a parking brake apparatus having a small size.

SUMMARY OF THE INVENTION

In order to achieve the above objects, according to a first aspect of the present invention, a parking brake apparatus is used for activating a brake unit. That is, a braking force is generated in the brake unit. The parking brake apparatus comprises a base member; an operating lever supported on the base member for generating an operating force when the operating lever is operated so that the operating force is transmitted to the brake unit through a brake cable; an inputting member to be rotated with the operating lever; an intermediating member disposed separately from the inputting member for interconnecting the inputting member and the brake cable; and a connection member for connecting the intermediating member and the inputting member so that the intermediating member transmits the operating force to the brake cable from the connection member.

According to a second aspect of the present invention, the parking brake apparatus according to the first aspect further comprises an input connection part connected to the connection member; and a brake cable connection part for connecting the brake cable.

According to a third aspect of the present invention, in the parking brake apparatus according to the first aspect, the intermediating member and the connection member are arranged such that a distance from a center of rotation of the intermediating member to the connection member becomes greater than a distance from the center of rotation of the intermediating member to the brake cable, so that the operating force is amplified.

According to a fourth aspect of the present invention, in the parking brake apparatus according to the first aspect, the operating lever includes a grip at a nose part thereof. The grip is arranged such that a distance from a center of rotation of the inputting member to the grip becomes greater than a distance from the center of rotation of the inputting member to the connection member, so that the operating force is amplified.

According to a fifth aspect of the present invention, in the parking brake apparatus according to the first aspect, the base member includes a bracket arranged to be removable from a car body. The intermediating member is supported on the bracket.

According to a sixth aspect of the present invention, in the parking brake apparatus according to the first aspect, the operating lever includes a locking mechanism for locking the operating lever while the braking force is generated in the brake unit. The locking mechanism includes a pawl supported on the operating lever at a location where a nose part thereof is engaged with a ratchet disposed in an upper portion of the base member; a release link supported on the operating lever for rocking the pawl to release from the ratchet; an energizing member having a first hook at one end thereof fixed to the release link and a second hook at the other end thereof for energizing a rear end part of the pawl; and an operating pushbutton for displacing the release link in a direction that the pawl is released from the ratchet. The energizing member energizes the rear end part of the pawl to maintain a state that the nose part of the pawl is engaged with the ratchet. Further, the energizing member energizes the release link in the direction that the pawl is released from the ratchet.

According to a seventh aspect of the present invention, in the parking brake apparatus according to the first aspect, the inputting member includes one of a first drum for winding the connection member and a first link for attaching one end of the connection member. Further, the intermediating member includes one of a second drum for winding the connection member and the brake cable separately and a second link for connecting the connection member and the brake cable separately.

According to an eighth aspect of the present invention, in the parking brake apparatus according to the first aspect, the inputting member includes a drum having a winding surface for winding the connection member. The winding surface has a curvature continuously increasing from a location where the connection member is attached.

According to a ninth aspect of the present invention, the parking brake apparatus according to the first aspect further comprises a first pivoting shaft for supporting the intermediating member and a second pivoting shaft for supporting the operating lever. The first pivoting shaft extends in a direction crossing a direction that the second pivoting shaft extends.

According to the present invention, it is possible to obtain the following functions.

With the parking brake apparatus, by rocking the operating lever, the inputting member is rotated. The direction of rocking the operating lever uniquely corresponds to the direction of rotation of the inputting member. In order to cause the brake unit to exert a braking force, the operating lever needs only to be operated in the raising direction. As the base member, either of a part of the car body or a bracket mounted to the car body may be selected, provided that it allows the operating lever to be rockably pivoted.

The inputting member and the intermediating member disposed separately from the inputting member are connected to each other by means of the connection member. The inputting member is, for example, a drum to be rotated around the center axis when the operating lever is rocked, and is provided in the operating lever. The connection member is, for example, a cable connected to the inputting member on one end side, and to the intermediating member on the other end side.

When the operating lever is raised and the inputting member is rotated, the connection member is drawn such that it is wound onto the inputting member. When the connection member is drawn, the intermediating member is rotated. The intermediating member is, for example, a link. To the intermediating member, not only the connection member is connected as described above, but also the brake cable for operating the brake unit is directly or indirectly connected. Indirect connection of the brake cable is performed, for example, by connecting the intermediating member to one end side of the connecting rod, and to the other end side of which the brake cable is connected.

As described above, when the intermediating member is rotated, the brake cable connected to the intermediating member is drawn. Thus, when the operating lever is raised, the operating force is transmitted to the brake unit through the brake cable, resulting in a braking force being generated.

When the operation of throwing the operating lever is performed, the above-mentioned respective components are operated in the reverse direction, resulting in the braking force being released.

According to the present invention, the parking brake apparatus can be rendered more compact through rendering the operating lever more compact. In that case, when the inputting member is not rendered more compact, resulting in the lever ratio having been lowered, by setting adequately the connection location for the connection member and the connection location for the brake cable in the intermediating member, the required lever ratio can be provided, while the parking brake apparatus can be rendered more compact.

In addition, in the parking brake apparatus, the connection member is connected to the input connection part of the intermediating member, and the brake cable is directly or indirectly connected to the brake cable connection part. The intermediating member is rotated around the center of rotation, i.e., the pivoting shaft by which it is pivoted. The distance from the center of rotation to the connection member is set to be greater than the distance from the center of rotation to the brake cable. Thereby, the operating force for rocking the operating lever transmitted from the connection member can be amplified and transmitted to the brake cable.

Therefore, with the compact apparatus, when the lever ratio on the inputting member side is rendered lower than the required one, adequate setting of the lever ratio on the intermediating member side allows the overall lever ratio to be set at a desired value. Thereby, by rendering the operating lever more compact, the entire parking brake apparatus can be rendered more compact. In addition, by disposing the intermediating member in the location where the space can be effectively utilized, the size can be further reduced.

In the parking brake apparatus, on the inputting member side, the distance from the grip provided in the nose part of the operating lever to the center of rotation of the inputting member is set greater than the distance from the center of rotation to the connection member. With this lever ratio on the inputting member, and the lever ratio on the intermediating member, the overall lever ratio can be set. Thereby, when the parking brake apparatus is rendered more compact, the lever ratio can be set at a desired value.

In the parking brake apparatus, the base member is a bracket removable from the car body, and the intermediating member is pivoted to the bracket. The operating lever, the inputting member, and the intermediating member are one device integrally provided in the base member, thereby reducing a size of the entire unit.

In the parking brake apparatus, the operating lever may comprise a locking mechanism capable of locking the state that a braking force is generated in the brake unit. In the upper part of the base member, the ratchet in the shape substantially of an arc is disposed. The locking mechanism is capable of being rotated such that the nose part of the pawl pivoted to the operating lever is engaged with or disengaged from the ratchet. The pawl is disengaged from the ratchet when the operating pushbutton is operated to synchronously rotate the release link pivoted to the operating lever in the direction that the pawl is disengaged from the ratchet.

The energizing member simultaneously energizes the pawl and the release link. The energizing member is, for example, a torsion spring loaded on the loading pin disposed between the pawl pivotal pin for pivoting the pawl and the release link pivotal pin for pivoting the release link, while the hook at one end is fixed to the release link. The fixing position is closer to the pawl from the release link pivotal pin.

The hook at the other end of the torsion spring energizes the rear end part of the pawl. Thereby, the pawl is energized in the direction that the engagement with the ratchet is maintained. At the same time, the release link is energized in the direction that the engagement between the pawl and the ratchet is canceled. In the standing state that the operation of the operating pushbutton is not performed, the pawl is energized in the direction of being engaged with the ratchet. Thereby, in the state that the brake unit exerts a braking force, even if the state is accidentally canceled, the pawl is immediately engaged with the ratchet thereafter, thus careless release of the brake can be prevented. In addition, the operation of the operating pushbutton will be directly transmitted to the release link, thus there is no need for providing a transmission member, such as a release rod used in a conventional parking brake. Accordingly, the parking brake apparatus can be rendered still more compact.

In the parking brake apparatus, the inputting member may comprise either one of a drum that the connection member can be wound, and a link to which one end of the connection member is mounted. The intermediating member may comprise either one of the drum that the connection member and the brake cable can be separately wound, respectively, and the link to which the connection member and the brake cable are separately connected, respectively.

When the drum is employed as the inputting member, a cable is used as the connection member regardless of whether the intermediating member is a drum or a link. When the link is employed as the inputting member, a rod, for example, is used as the connection member.

The intermediating member may have a portion in the shape of a drum that the cable can be wound, and a portion to which the rod can be connected. In this case, either the input connection part or the brake cable connection part may be provided as a portion in the shape of a drum, or either of them may be provided as a portion to which the rod can be connected. When the brake cable connection part is provided as a portion to which the rod can be connected, it is connected to the connecting rod, to which the brake cable is connected.

In the parking brake apparatus, the inputting member may include a drum. When the operating lever is operated, the cable, i.e., the connection member, is wound onto the winding surface of the drum. With the drum, the curvature of the winding surface is continuously increased from the location where the connecting cable is mounted, thus the lever ratio is continuously increased from the mounting location. Therefore, at the start of raising the operating lever, the length of the connecting cable wound onto the winding surface with respect to the amount of operation of the operating lever is longer. At the end of the operation, the length of the connecting cable wound onto the winding surface is shorter. Immediately after raising the operating lever, the pulling force by the brake cable is small, thus the brake cable can be easily drawn, even if the lever ratio is low.

On the other hand, just before the end of the operation, the pulling force by the brake cable is large. However, the lever ratio is increased, thus further drawing the brake cable against the pulling force by the brake cable can be easily performed. Thereby, the brake cable can be positively drawn until a desired braking force is generated on the brake unit side.

In the parking brake apparatus, the intermediating member is located more downward than the inputting member, for example, being disposed in the lower portion of the base member. The mounting part on the base member side that the intermediating member is mounted may be angled toward the direction of intersecting the vertical direction of the base member, thus the direction that the pivoting shaft for pivoting the intermediating member extends can be set to be either in parallel or not in parallel with the direction that the lever pivotal pin for pivoting the operating lever extends. Therefore, even if the installation space for the parking brake apparatus is limited, the brake cable can be connected in an adequate location.

DETAILED DESCRIPTION OF THE PREFERRED EMBODIMENTS

Hereunder, embodiments of the present invention will be described with reference to the drawings. FIG. 1 to FIG. 7 show an embodiment of the present invention.

Figure 1:
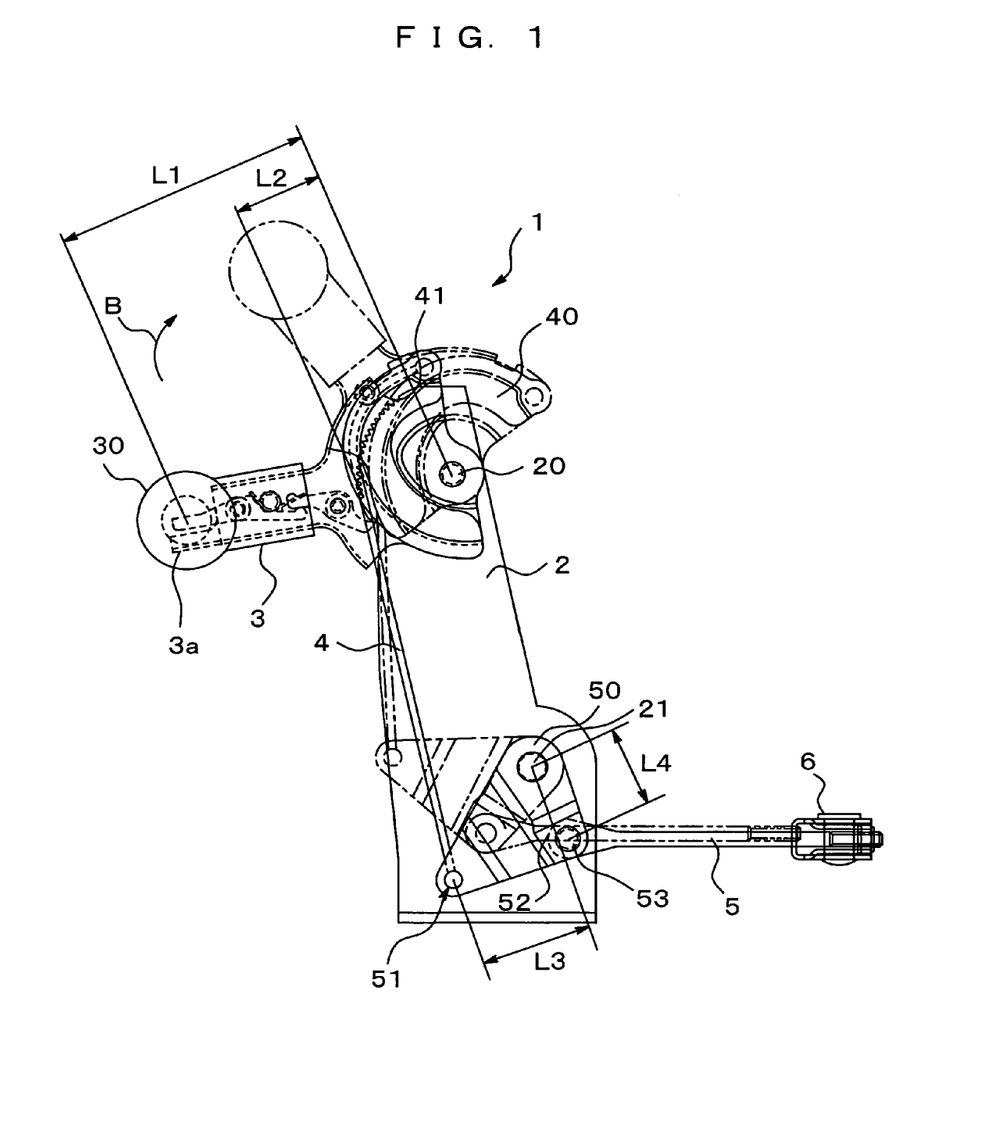
FIG. 1 is a side view illustrating a parking brake apparatus pertaining to an embodiment of the present invention.

As shown in FIG. 1, in a parking brake apparatus 1, an operating lever 3 is rockably pivoted to a base member 2 which is fixedly installed on the side of the car body of a vehicle (not shown), such as a passenger car, or the like. When the passenger grasps a grip 30 provided in the nose part of the operating lever 3 by hand to operate the operating lever 3, a brake cable (not shown) is drawn in synchronization therewith, so that the operating force is transmitted to a brake unit (not shown) for generation of a braking force.

The base member 2 is fixedly installed on the side of the car body in the vicinity of, for example, a center console in the passenger car. In the upper portion, the operating lever 3 is rockably pivoted on a lever pivotal pin 20 (pivoting shaft). On the side of the base end part of this operating lever 3, a drum 40 (inputting member) is fixedly installed. The lever pivotal pin 20 penetrates in the drum 40, so that when the operating lever 3 is rocked, the drum 40 is rotated integrally with the operating lever 3 around the lever pivotal pin 20.

In the mounting part 22 in the lower portion of the base member 2 separated from the drum 40 in the vertical direction, an intermediating link 50 (intermediating member) which intermediates between the drum 40 and the brake cable is disposed. The intermediating link 50 is rotatably pivoted with an intermediating member pivotal pin 21 (pivoting shaft). The intermediating link 50 receives the operating force for rocking the operating lever 3 from the drum 40 to transmit it to the brake cable. The operating force from the drum 40 is transmitted through a connecting cable 4 (connection member) connecting between the drum 40 and the intermediating link 50. The mounting part 22 of the base member 2 may be angled (see FIG. 2, FIG. 5, and FIG. 6), thus the intermediating link 50 may be laterally displaced. Thereby, the lever pivotal pin 20 and the intermediating member pivotal pin 21 can be disposed such that the respective directions are in parallel with each other, or disposed such that the respective directions are not in parallel with each other. Consequently, the brake cable can be connected in an adequate position.

The drum 40 has a winding surface 41, i.e., a side surface in an arc shape. On the winding surface 41, the connecting cable 4 is wound or unwound, respectively, by rocking the operating lever 3. The section of the winding surface 41 is formed in the shape of a concave in order to wind the connecting cable 4 reliably. To the winding surface 41, one end part of the connecting cable 4 is connected. The other end part of the connecting cable 4 is connected to an input connection part 51 of the intermediating link 50. With the connecting cable 4, the operating force of the operating lever 3 is transmitted from the drum 40 to the intermediating link 50.

The transmissibility of the operating force depends upon the lever ratio of the operating lever 3. The lever ratio of the operating lever 3 is the ratio (L1/L2) between the distance L1 from the lever pivotal pin 20, i.e., the center of rotation of the drum 40, to the grip 30, and the distance L2 from the lever pivotal pin 20 to the connecting cable 4. The distance L1 is greater than the distance L2. The distance L2 from the lever pivotal pin 20 to the connecting cable 4 is the distance between the center of the lever pivotal pin 20 and the position where the connecting cable 4 leaves the winding surface 41.

Figure 7:
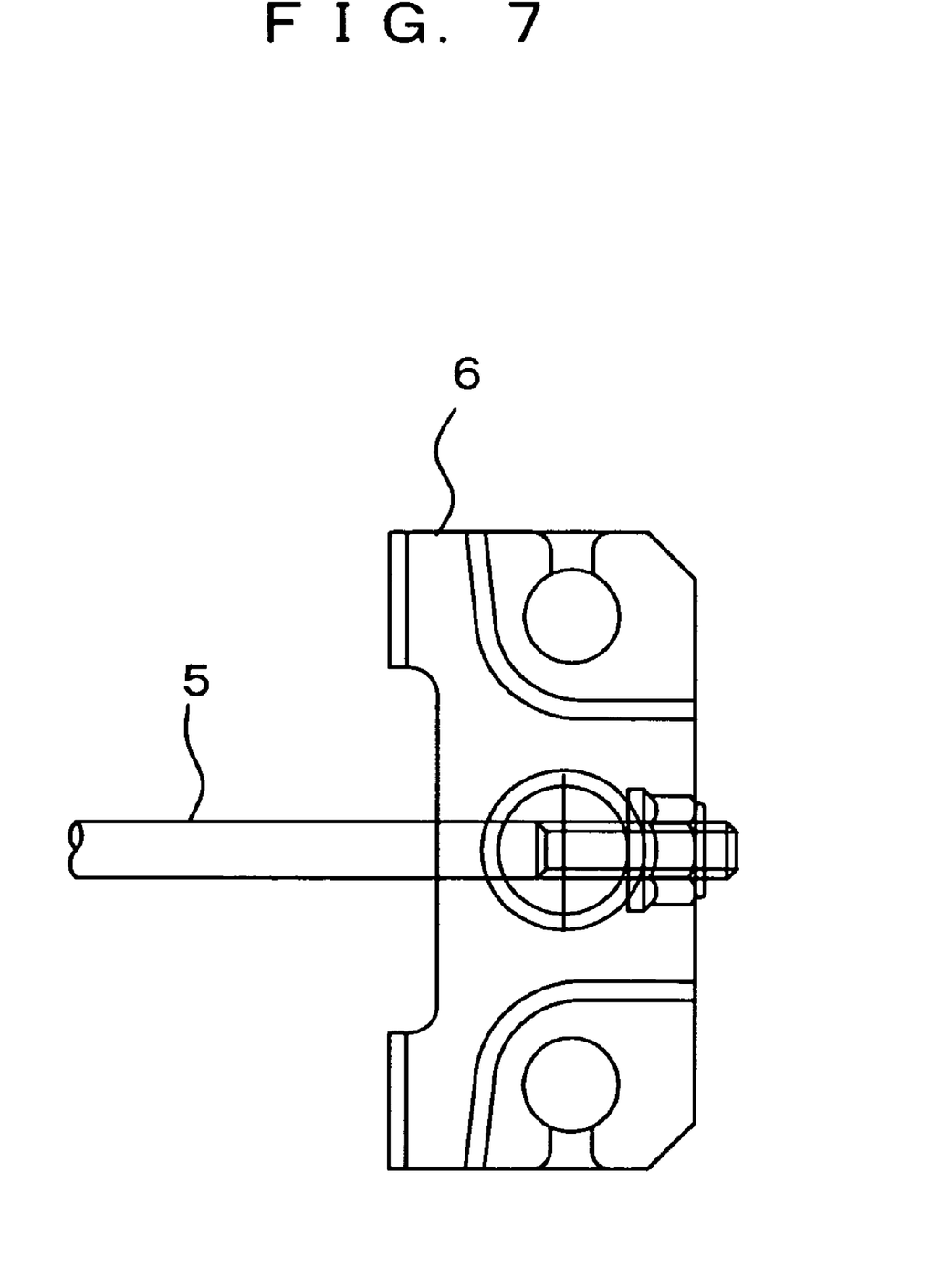
FIG. 7 is a plan view illustrating an equalizer shown in FIG. 1.

The other end of the connecting cable 4 is connected to the input connection part 51 of the intermediating link 50. In the embodiment, the intermediating link 50 is a triangular plate-like link, and is provided with a brake cable connection part 52 for connecting the brake cable. In the brake cable connection part 52, one end part of a connecting rod 5 is rotatably pivoted with a pin 53. As shown in FIG. 7, to the other end part of the connecting rod 5, an equalizer 6 is connected, and the brake cable is connected to the equalizer 6. The brake cable may be directly connected to the brake cable connection part 52.

The distance L3 from the intermediating member pivotal pin 21, i.e., the center of rotation of the intermediating link 50, to the connecting cable 4 is greater than the distance L4 from the intermediating member pivotal pin 21 to the pin 53 that the connecting rod 5 on the brake cable side is connected. Thereby, the operating force for rocking the operating lever 3 transmitted from the connecting cable 4 is amplified and transmitted to the brake cable.

An overall lever ratio LR of the parking brake apparatus 1, is expressed as the following equation using the ratio of the distances L3 and L4 of the drum 40.

$$LR=(L1/L2)\times(L3/L4)=L1\cdot L3/L2\cdot L4$$

Therefore, even if the operating lever 3 is shortened without reducing the distance L2, through adequate setting of the distances L3 and L4 of the intermediating link 50, it is possible to provide the lever ratio and the output stroke of the brake cable required for the parking brake apparatus.

Figure 3:
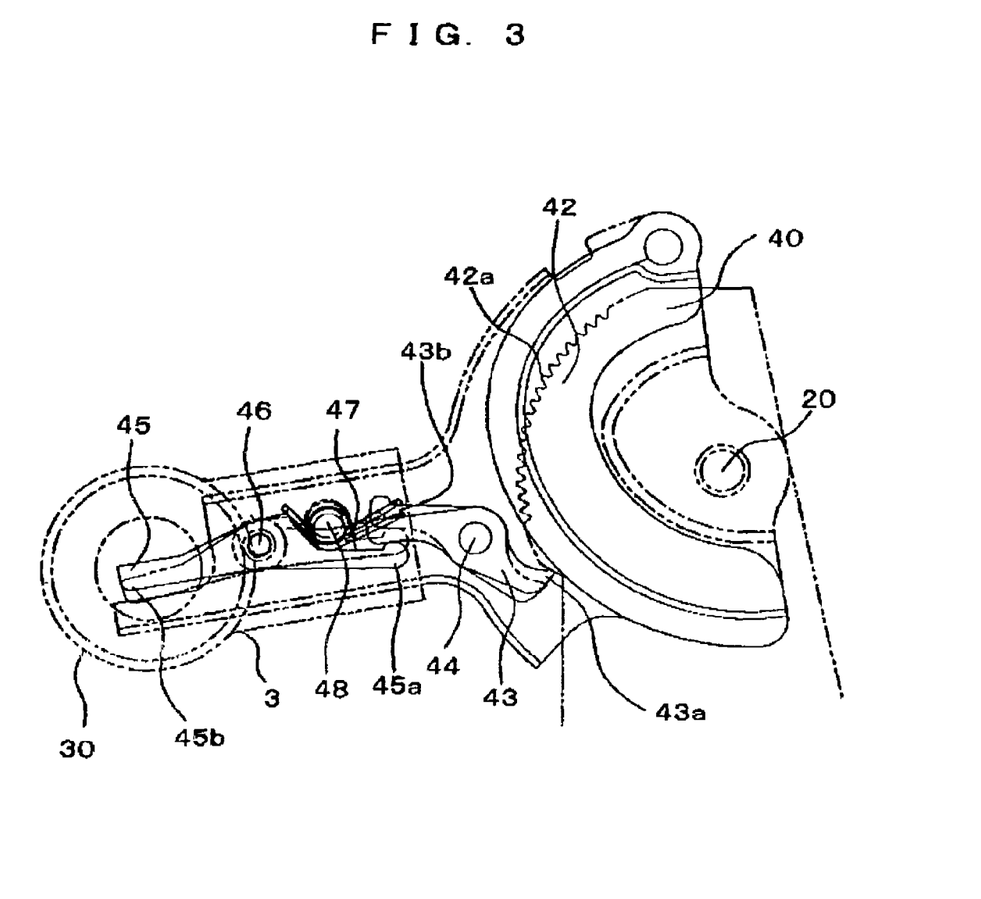
FIG. 3 is an enlarged view illustrating a locking mechanism and surrounding members shown in FIG. 1.

As shown in FIG. 1 and FIG. 3, the parking brake apparatus 1 comprises a locking mechanism for locking the operating lever 3 in a state that the brake unit exerts a braking force. The locking mechanism essentially includes a ratchet 42 disposed in the upper portion of the base member 2; a pawl 43 with a nose part engaging with the ratchet 42; a release link 45 for displacing the pawl 43 in a direction that the pawl 43 is disengaged from the ratchet 42; a torsion spring 47 (energizing member) for energizing the pawl 43 and the release link 45; and an operating pushbutton 31 for displacing the release link 45 to displace the pawl 43 in the direction of being disengaged from the ratchet 42. An edge part of the upper portion of the base member 2 is formed in an arc shape, and a tooth part 42a is formed on the edge part of the upper portion to form the ratchet 42. Therefore, the ratchet 42 is immobile.

As shown in FIG. 3, the operating lever 3 has a hollow shaft part. The pawl 43, the release link 45, and the torsion spring 47 are disposed inside the shaft part. The nose part of the operating lever 3, where the grip 30 is provided, extends into the central portion of the grip 30 a stopper 3a for preventing the operating pushbutton 31 from being dropped off. The pawl 43 is rotatably pivoted on a pawl pivotal pin 44 mounted to the operating lever 3. The nose part 43a closer to the ratchet 42 can be engaged with the tooth part 42a of the ratchet 42.

The release link 45 is rotatably pivoted on a release link pivotal pin 46 mounted to the operating lever 3. The release link pivotal pin 46 is disposed closer to the grip 30 than the pawl pivotal pin 44. The release link 45 extends to a location where the nose part 45a, which is closer to the pawl 43, can but against the rear end part 43b of the pawl 43. On the other hand, the rear end part 45b of the release link 45 extends to the central portion of the grip 30.

Between the pawl pivotal pin 44 and the release link pivotal pin 46, a loading pin 48 provided with the torsion spring 47 is disposed. The torsion spring 47 is wound around the loading pin 48. A hook formed at one end of the torsion spring 47 is hooked with the rear end part 43b of the pawl 43. Thereby, the pawl 43 is energized in the direction that the engagement with the ratchet 42 is maintained. Another hook is formed at the other end of the torsion spring 47. The hook is fixed to the release link 45 at a location closer to the nose part 45a than the location of the release link pivotal pin 46. Thereby, the release link 45 is energized in a direction same as the direction that the nose part 45a presses the rear end part 43b of the pawl 43 to release the pawl 43 from the ratchet 42.

The energizing forces from the respective ends of the torsion spring 47 act such that they rotate the pawl 43 in the opposite directions as described above. When the operating pushbutton 31 is not operated, the energizing force in the direction that the nose part 43a of the pawl 43 is engaged with the tooth part 42a of the ratchet 42 is greater, so that the nose part 43a of the pawl 43 is engaged with the tooth part 42a of the ratchet 42.

Figure 2:
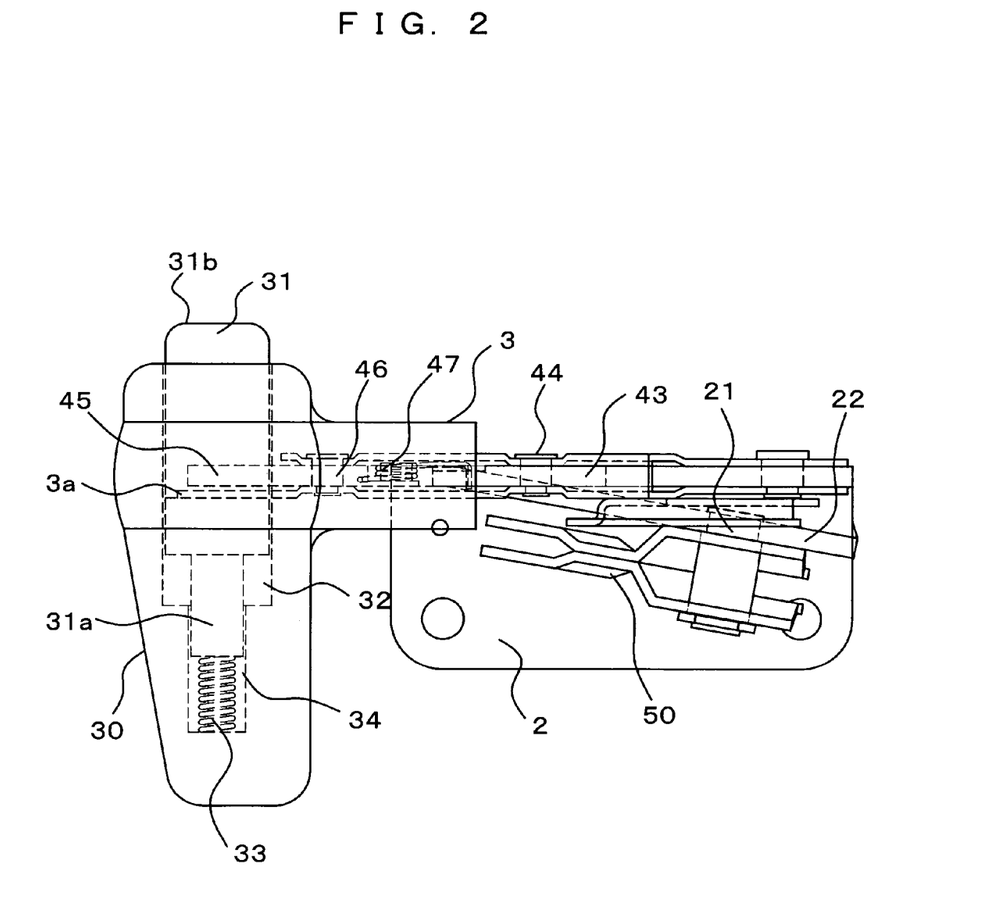
FIG. 2 is a plan view illustrating the parking brake apparatus pertaining to the embodiment of the present invention.

As shown in FIG. 2, the longitudinal direction of the grip 30 having the operating pushbutton 31 is substantially orthogonal to the direction that the operating lever 3 extends, and thus the grip 30 forms a substantially T-shape together with the operating lever 3. Thereby, the grip 30 and the operating lever 3 can be rendered small as compared to a conventional unit in which the longitudinal direction of the grip 30 is substantially aligned with that of the operating lever 3.

The operating pushbutton 31 is provided on the side of one end of the grip 30 closer to the thumb when the grip 30 is gripped with the back of the hand being directed upward. Therefore, the pushbutton can be operated with a thumb for releasing the braking force exerted by the brake unit.

The operating pushbutton 31 has a cylindrical contour, and an accommodation hole 32 for accommodating the operating pushbutton 31 extends in the grip 30 in the longitudinal direction. Further, following the accommodation hole 32, a small hole 34 having a diameter smaller than that of the accommodation hole 32 extends. A compression coil spring 33 is accommodated in the small hole 34. A shaft part 31a having a small diameter extending from a shoulder part of the operating pushbutton 31 is accommodated in the small hole 34.

The compression coil spring 33 energizes the shaft part 31a in the direction of pushing out the operating pushbutton 31. When the later described cutout part 35 (see FIG. 4) abuts against the operating lever 3, the compression coil spring 33 cannot further push out the operating pushbutton 31. The operating pushbutton 31 can be pushed in at the head part 31b against the energizing force of the compression coil spring 33.

Figure 4:
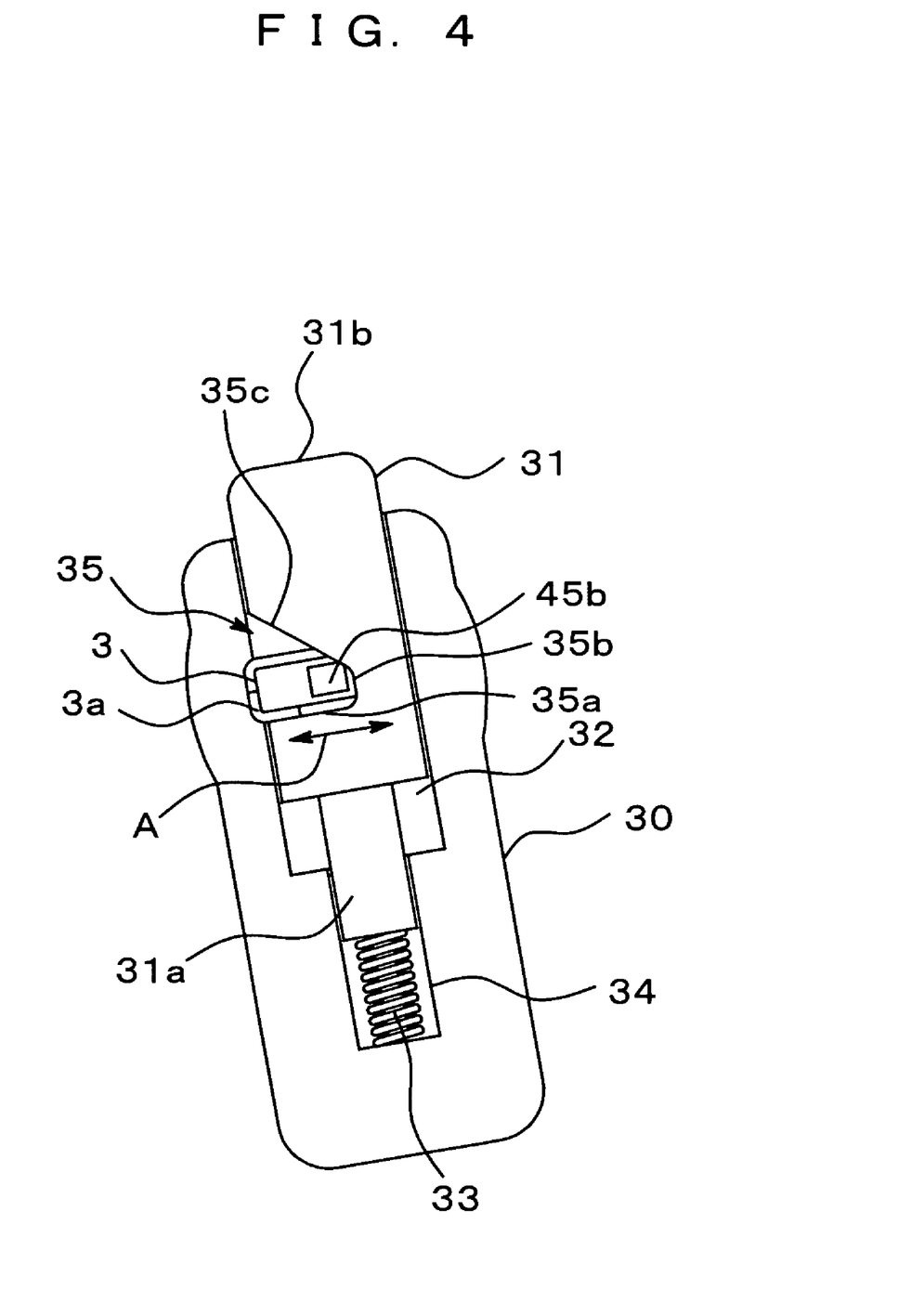
FIG. 4 is an explanatory drawing for an internal construction of a grip shown in FIG. 1.
Figure 5:
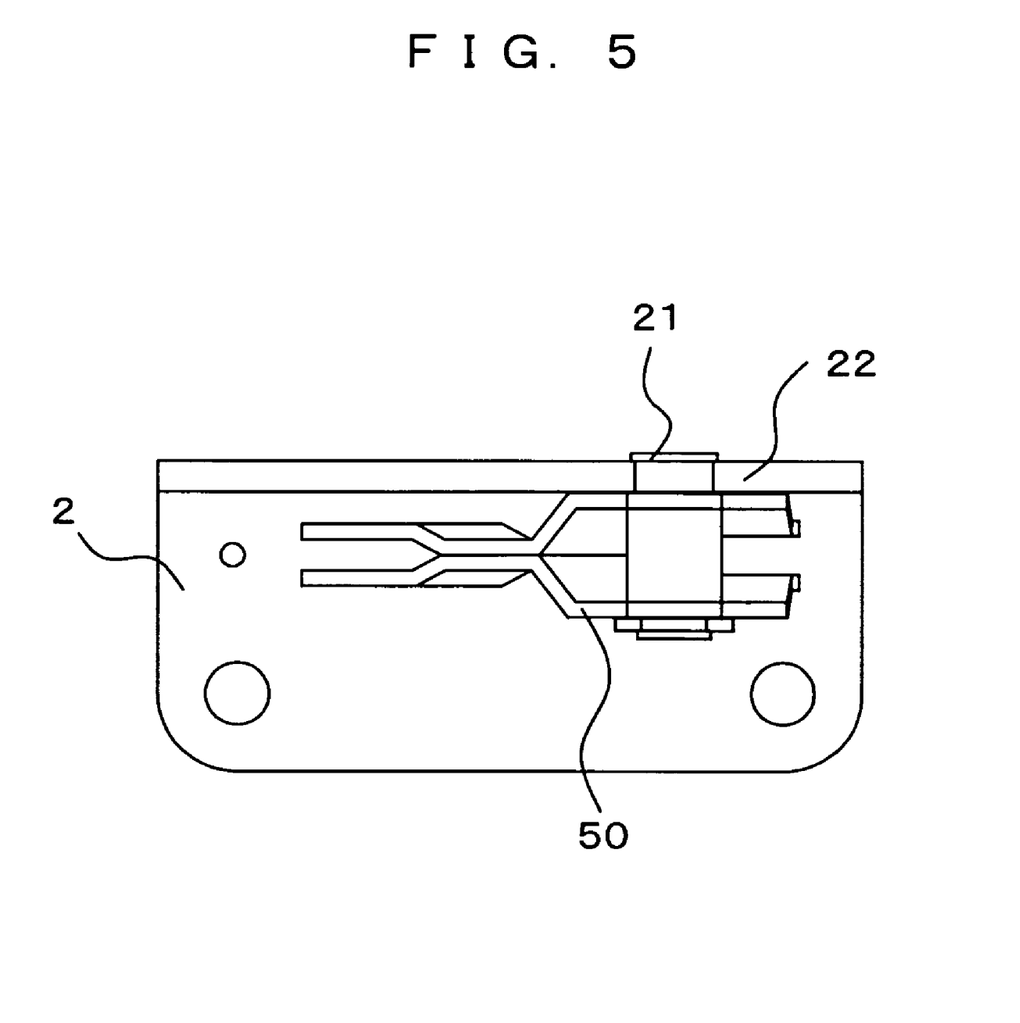
FIG. 5 is a plan view illustrating an intermediating link shown in FIG. 1.
Figure 6:
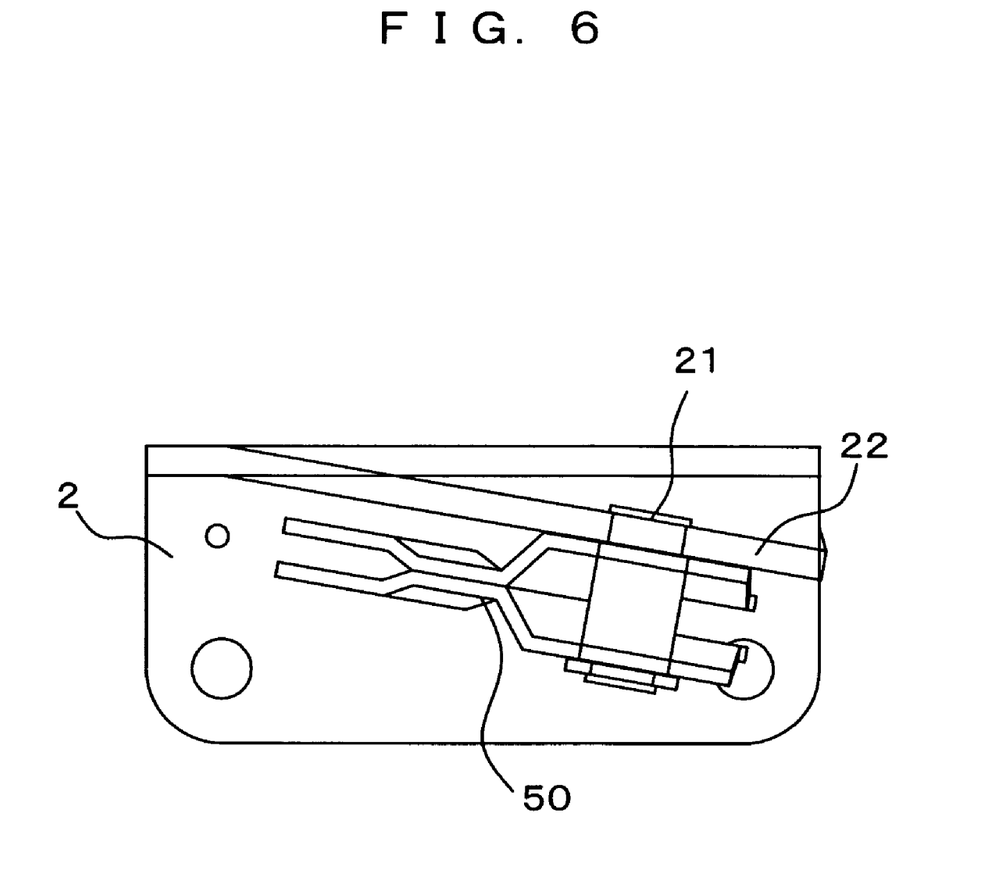
FIG. 6 is a plan view illustrating the intermediating link shown in FIG. 5 in a laterally displaced state.

As shown in FIG. 4, the cutout part 35 is formed in the operating pushbutton 31. The cutout part 35 is formed of an orthogonal portion 35a cut out in the direction substantially orthogonal to the longitudinal direction of the operating pushbutton 31; a longitudinal direction portion 35b extending from the orthogonal portion 35a in the longitudinal direction; and a cam part 35c extending from the longitudinal direction portion 35b toward the head part 31b in an inclined state. The rear end part 45b of the release link 45 buts against the cam part 35c. When the operating pushbutton 31 is operated to displace the cam part 35c, the rear end part 45b is displaced in the direction orthogonal to the longitudinal direction of the operating pushbutton 31 (the direction of arrow A), while changing the position abutting against the cam part 35c. In other words, the release link 45 is rocked around the release link pivotal pin 46.

An operation of the parking brake apparatus 1 will be described next. In the parking brake apparatus 1, the drum 40 is rotated when the operating lever 3 is rocked. As shown in FIG. 1, when the brake unit exerts no braking force, the operating lever 3 and the intermediating link 50 become the state expressed by solid lines. When the operating lever 3 is raised forward (the arrow direction B) from this state, the brake unit exerts the braking force.

When the operating lever 3 is raised, the drum 40 is simultaneously rotated around the lever pivotal pin 20. Thereby, the connecting cable 4 is drawn and wound around the winding surface 41. When the connecting cable 4 is drawn, the intermediating link 50 having the input connection part 51 connected to the connecting cable 4 is rotated around the intermediating member pivotal pin 21.

When the intermediating link 50 is rotated, the brake cable connected to the brake cable connection part 52 is drawn, so that the operating force is transmitted to the brake unit through the brake cable, thereby generating the braking force. The braking force is increased in proportion to the drawn amount of the brake cable. When the force for raising the operating lever 3 is removed in the state that the brake cable is drawn, the nose part 43a of the pawl 43 in the locking mechanism is engaged with the tooth part 42a of the ratchet 42, thereby maintaining the state.

As shown in FIG. 3, when the operating lever 3 is pushed down and the brake unit exerts no braking force, the nose part 43a of the pawl 43 does not reach the tooth part 42a of the ratchet 42. When the operating lever 3 is raised from this state without operating the operating pushbutton 31, the nose part 43a reaches the tooth part 42a.

At this time, the rear end part 43b of the pawl 43 receives the energizing force directly from the torsion spring 47. Thus, the nose part 43a is energized in the direction of being engaged with the tooth part 42a. Accordingly, when the operating lever 3 is raised, the nose part 43a is engaged with the tooth part 42a. The torsion spring 47 also energizes the release link 45, so that the nose part 45a presses the rear end part 43b. Accordingly, the pawl 43 receives a force in the direction that the nose part 43a is released from the tooth part 42a. As a result, when the operating lever 3 is further raised, the pawl 43 is rocked while the nose part 43a contacts with the tooth part 42a, so that the operating lever 3 can be raised to a desired position. When the force for raising the operating lever 3 is released, the nose part 43a is engaged with the tooth part 42a, thereby locking the operating lever 3.

When the operating lever 3 is pushed down while the operating pushbutton 31 is pushed into the grip 30, the operating lever 3 is released. FIG. 4 shows a state before the operating pushbutton 31 is operated. When the operating pushbutton 31 is pushed in from this state, the rear end part 45b of the release link 45 is pressed by the cam part 35c of the operating pushbutton 31. Accordingly, the release link 45 is displaced in the operating lever 3 toward the end thereof in the direction that the nose part 45a of the release link 45 pushes up the rear end part 43b of the pawl 43 to cancel the engagement of the nose part 43a of the pawl 43 with the tooth part 42a. Thus, when the operating lever 3 is returned while the operating pushbutton 31 is pushed to cancel the engagement of the nose part 43a with the tooth part 42a, the brake unit can be returned to the state that no braking force is generated.

With the locking mechanism, when the operating pushbutton 31 is not operated, the pawl 43 is energized in the direction of being engaged with the ratchet 42. Thereby, even if the operating pushbutton 31 is accidentally operated to cancel the engagement in the state that the brake unit exerts the braking force, the pawl 43 is immediately engaged with the ratchet 42, thereby preventing a careless release of the brake. In addition, the operation of the operating pushbutton 31 is directly transmitted to the release link 45. Accordingly, it is not necessary to provide a transmission member such as a release rod and the like, thereby making the parking brake apparatus 1 compact.

According to the present invention, with the intermediating link 50 as an intermediating member, the distance L1 from the lever pivotal pin 20, i.e., the center of rotation of the operating lever 3, to the grip 30 can be reduced without changing the distance L2 from the lever pivotal pin 20 to the connecting cable 4, thereby making the operating lever 3 and the parking brake apparatus 1 compact. When the drum 40, i.e., the inputting member on the operating lever 3, maintains a size thereof and the lever ratio decreases, it is possible to adequately set the distance L3 from the intermediating member pivotal pin 21 in the intermediating link 50 to the connecting cable 4 and the distance L4 from the intermediating member pivotal pin 21 to the pin 53. Accordingly, even if the lever ratio decreases, the required lever ratio to be obtained. In addition, an output stroke of approx. 30 mm, which is generally required, can be easily obtained.

In the present invention, the intermediating link 50 and the drum 40 are separately disposed in the vertical direction, so that the space can be effectively used. In addition, the intermediating link 50 may be angled such that the mounting part 22 on the base member 2 is laterally displaced. Thereby, the direction that the intermediating member pivotal pin 21 extends can be freely set to be either in parallel or crossing the direction that the lever pivotal pin 20 extends. Therefore, even if the installation space for the parking brake apparatus 1 is limited, the brake cable can be connected in an adequate position.

In the embodiments, the operating lever 3, the drum 40, and the intermediating link 50 are disposed on the base member 2, and may be disposed on a different member, respectively, as far as the operating lever 3 can be rockably pivoted and the intermediating link 50 can be rotatably pivoted. The base member may include a part of the car body, a bracket, or the like, for rockably supporting the operating lever. The drum 40 is provided for winding the connecting cable 4 as the inputting member, and the inputting member may be a link to which one end of the connecting cable 4 is mounted. The intermediating link 50 is provided as the intermediating member for separately connecting the connecting cable 4 and the brake cable, and the intermediating member may be a drum that the connecting cable 4 and the brake cable can be separately wound, respectively.

When a drum is used as the inputting member, a cable is used as the connection member, regardless of whether the intermediating member is a drum or a link. In addition, when a link is used as the inputting member, a rod, for example, is used as the connection member.

The intermediating link 50 may have a drum-like portion that the connecting cable 4 can be wound, and a portion to which a rod can be connected. Either the input connection part 51 or the brake cable connection part 52 may be provided in the drum-like portion, and either of them may be adapted to be capable of being connected to the rod. When the brake cable connection part 52 is adapted to be capable of being connected to the rod, it may be connected to the connecting rod 5, and the connecting rod 5 may be connected to the brake cable. When the brake cable is connected to the intermediating link 50 through the connecting rod 5, the brake cable needs no longer be curved every time the operating lever 3 is operated, which allows the reduction in durability to be prevented.

When the inputting member is a drum, the winding surface 41 for winding the connecting cable 4 may have a curvature continuously increasing from the location where the connecting cable 4 is mounted (the mounting location). In this case, the lever ratio increases continuously from the mounting location. Therefore, at the start of raising the operating lever 3, the rate of the length of the connecting cable 4 wound on the winding surface 41 with respect to the amount of operation of the operating lever 3 is higher. At the end of the operation, the rate is lower. Immediately after raising the operating lever 3, the pulling force by the brake cable is small, thus the brake cable can be easily drawn, even if the lever ratio is low. On the other hand, just before the operation, the pulling force by the brake cable is large, but the lever ratio is high, thus further drawing the brake cable against the pulling force by the brake cable can be easily performed. Thereby, the brake cable can be positively drawn until the brake unit exerts a desired braking force.

According to the parking brake apparatus pertaining to the present invention, the intermediating member is disposed in the location separate from the inputting member. By connecting between the inputting member and the intermediating member with the connection member, the operating force is transmitted from the inputting member side to the intermediating member. Thus, by setting the disposition location of the intermediating member adequately, the parking brake apparatus can be rendered more compact.

According to the parking brake apparatus pertaining to the present invention, the intermediating member is rotated around the center of rotation, i.e., the portion pivoted to the base member. The distance from the center of rotation to the connection member is set greater than the distance from the center of rotation to the brake cable. Thereby, the operating force for rocking the operating lever transmitted from the connection member can be amplified and transmitted to the brake cable. In addition, even if, with the apparatus being rendered more compact, the lever ratio on the inputting member side should be rendered lower than the required one, adequate setting of the lever ratio on the intermediating member side allows the overall lever ratio to be set at a desired value. Thereby, by rendering the operating lever more compact, the entire parking brake apparatus can be rendered more compact.

According to the parking brake apparatus pertaining to the present invention, the distance from the grip provided in the operating lever to the center of rotation of the inputting member is set greater than the distance from the center of rotation to the connection member, thus the operating lever can be operated with a small force. In addition, with the lever ratio on the inputting member side and the lever ratio on the intermediating member side, the overall lever ratio can be set. Thus, in the case that the parking brake apparatus is rendered more compact, the lever ratio can be set at a desired value.

According to the parking brake apparatus pertaining to the present invention, the base member is a bracket removable from the car body. To the bracket, the operating lever, the inputting member and the intermediating member are disposed. Thereby, the entire unit can be rendered an integral device, which allows the versatility to be increased.

According to the parking brake apparatus pertaining to the present invention, the release link for rocking the pawl engaged with the ratchet to be disengaged from the ratchet can be directly operated by means of the operating pushbutton provided on the operating lever, not through the member, such as a release rod, or the like, so that the size can be rendered more compact. In addition, the energizing member energizes the rear end part of the pawl to maintain the state that the nose part of the pawl is engaged with the ratchet. At the same time, the energizing member energizes the release link in the direction that the engagement between the pawl and the ratchet is canceled. Thus, even if the operating pushbutton is accidentally depressed when the pawl and the ratchet are engaged with each other, the energizing force of the energizing member will immediately return the pawl and the ratchet to the engagement state thereafter, so that careless release of the brake from the locked state can be prevented.

According to the parking brake apparatus pertaining to the present invention, each of the inputting member and the intermediating member may be either a drum that the cable can be wound, or a link to which the connection member, such as a rod, can be mounted. There is no limitation to the combination of these, thus a variety of layout can be provided, resulting in the versatility being further increased.

According to the parking brake apparatus pertaining to the present invention, the curvature of the winding surface of the drum, which is the inputting member, is continuously increased from the location where the connecting member is mounted, thus the lever ratio is continuously increased. Therefore, in the operation for raising the operating lever, the connecting member can be drawn lightly and efficiently at the beginning, and near the end of the operation, can be drawn strongly. Thus, it is easy to further draw the brake cable while resisting the pulling force by the brake cable, which allows the brake cable to be positively drawn until a desired braking force is generated on the brake unit side.

According to the parking brake apparatus pertaining to the present invention, the direction that the pivoting shaft for pivoting the intermediating member extends is not in parallel with the direction that the pivoting shaft for pivoting the operating lever extends. Thus, even in a case that the connection location for the brake cable is limited, the brake cable can be connected in an adequate state.

The disclosure of Japanese Patent Application No. 2004-345051, filed on Nov. 30, 2004, is incorporated in the application.

While the invention has been explained with reference to the specific embodiments of the invention, the explanation is illustrative and the invention is limited only by the appended claims.

What is claimed is:

1. A parking brake apparatus for activating a brake unit, comprising:
   a base member;
   an operating lever supported on the base member for generating an operating force when, the operating lever is operated so that the operating force is transmitted to the brake unit through a brake cable;
   an inputting member to be rotated with the operating lever;
   an intermediating member disposed separately from the inputting member for interconnecting the inputting member and the brake cable; and
   a connection member for connecting the intermediating member and the inputting member so that the intermediating member transmits the operating force to the brake cable from the connection member when the intermediating member rotates, wherein said intermediating member includes an input connection part connected to the connection member and a brake cable connection part for connecting the brake cable.

2. The parking brake apparatus according to claim 1, wherein said intermediating member and said connection member are arranged such that a distance from a center of rotation of the intermediating member to the connection member becomes greater than a distance from the center of rotation of the intermediating member to the brake cable so that the operating force is amplified.

3. The parking brake apparatus according to claim 1, wherein said operating lever includes a grip at a nose part thereof, said grip being arranged such that a distance from a center of rotation of the inputting member to the grip becomes greater than a distance from the center of rotation of the inputting member to the connection member so that the operating force is amplified.

4. The parking brake apparatus according to claim 1, wherein said base member includes a bracket arranged to be removable from a car body, said intermediating member being supported on the bracket.

5. The parking brake apparatus according to, claim 1, wherein said operating lever includes a locking mechanism for locking the operating lever while the braking force is generated in the brake unit, said locking mechanism including a pawl supported on the operating lever at a location where a nose part thereof is engaged with a ratchet disposed in an upper portion of the base member; a release link supported on the operating lever for rocking the pawl to release from the ratchet; an energizing member having a first hook at one end thereof fixed to the release link and a second hook at the other end thereof for energizing a rear end part of the pawl; and an operating pushbutton for displacing the release link in a direction that the pawl is released from the ratchet, said energizing member energizing the rear end part of the pawl to maintain a state that the nose part of the pawl is engaged with the ratchet, said energizing member energizing the release link in the direction that the pawl is released from the ratchet.

6. The parking brake apparatus according to claim 1, wherein said inputting member includes a drum having a winding surface for winding the connection member, said winding surface having a curvature continuously increasing from a location where the connection member is attached so that the drum winds the connecting member around the winding surface by a ratio of a length larger relative to an operation amount of the operating lever when the operating lever starts lifting, said ratio becoming smaller at an end of an operation of the operating lever.

7. The parking brake apparatus according to claim 1, further comprising a first pivoting shaft for supporting the intermediating member and a second pivoting shaft for supporting the operating lever, said first pivoting shaft extending in a direction crossing a direction that the second pivoting shaft extends.

* * * * *